United States Patent
Yamamichi

(10) Patent No.: US 7,340,093 B2
(45) Date of Patent: Mar. 4, 2008

(54) LUMINESCENT INTENSITY ANALYSIS METHOD AND APPARATUS

(75) Inventor: Junta Yamamichi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 11/092,859

(22) Filed: Mar. 30, 2005

(65) Prior Publication Data

US 2005/0220342 A1   Oct. 6, 2005

(30) Foreign Application Priority Data

Mar. 31, 2004   (JP)   ............... 2004-104943

(51) Int. Cl.
*G06K 9/00* (2006.01)

(52) U.S. Cl. .............. 382/172; 382/168; 382/128

(58) Field of Classification Search ........ 382/168–172, 382/274, 130; 702/180
See application file for complete search history.

(56) References Cited

U.S. PATENT DOCUMENTS

| | | | | |
|---|---|---|---|---|
| 5,117,293 A | * | 5/1992 | Asada et al. ............ | 358/2.1 |
| 5,134,573 A | * | 7/1992 | Goodwin ............... | 382/141 |
| 6,743,576 B1 | * | 6/2004 | Sabry et al. ........... | 435/4 |
| 2001/0006783 A1 | * | 7/2001 | Nogami ................. | 435/6 |
| 2002/0042079 A1 | * | 4/2002 | Simon et al. .......... | 435/7.1 |
| 2003/0053686 A1 | * | 3/2003 | Luo et al. .............. | 382/165 |
| 2003/0228565 A1 | * | 12/2003 | Oestreicher et al. .... | 435/4 |
| 2006/0204071 A1 | * | 9/2006 | Ortyn et al. ........... | 382/133 |

FOREIGN PATENT DOCUMENTS

| | | |
|---|---|---|
| JP | 3-089141 | 4/1991 |
| JP | 2947305 | 7/1999 |
| JP | 3129631 | 11/2000 |
| JP | 3270722 | 1/2002 |

OTHER PUBLICATIONS

U.S. Appl. No. 10/547,794 (Ikeda et al.), pending.
U.S. Appl. No. 11/165,524 (Hatakeyama et al.), pending.

* cited by examiner

*Primary Examiner*—Matthew C. Bella
*Assistant Examiner*—Claire Wang
(74) *Attorney, Agent, or Firm*—Fitzpatrick, Cella, Harper & Scinto.

(57) ABSTRACT

An image including a signal component and a background component is digitized into a brightness distribution and is divided into the signal component and the background component. An optimized threshold gradient value is previously determined and is used for creating a calibration curve from only the signal component. A statistical analysis value is computed based on the calibration curve.

7 Claims, 7 Drawing Sheets

LUMINESCENT INTENSITY ANALYSIS METHOD AND APPARATUS

BACKGROUND OF THE INVENTION

1. Field of the Invention

The present invention relates to a luminescent intensity analysis method and apparatus for quantification of a chemical substance.

2. Related Background Art

The quantification of a luminescent substance captured on a thin film or a plate, based on the luminescent intensity of a fluorescent substance or the like, is widely performed. In the case where the in-plane distribution of luminescent intensity of an obtained image is uniform, the luminescent intensity of the luminescent surface can be used for quantification. However, in the case where the luminescent state is not uniform, it is necessary to separate luminescent portions from non-luminescent portions so as to enhance quantitativity. Japanese Patent Nos. 2947305 and 3270722 (US AA2001006783) disclose a procedure in which, for the measurement of the concentration of a fluorescent substance in a microorganism after obtaining a fluorescent intensity image, the obtained image is binarized with a predetermined threshold value, then excising sites to be measured, and integrating the fluorescent intensity of the sites. Furthermore, Japanese Patent No. 3129631 discloses a method including dyeing a bacterium with a luminescent enzyme, obtaining a calibration curve illustrative of the relation between the total luminescent amount and the number of bacterial bodies to be measured to obtain the number of bacterial bodies, or divide the total luminescent amount by the average luminescent amount per bacterial body to obtain the number of bacterial bodies.

However, according to the above-mentioned measurement method, it is basically necessary to excise sites to be measured, and to set an arbitrary processing standard suitable for the measurement system. Furthermore, in the case of processing an image exceeding the optical resolution, the morphological significance of excision will be lost.

SUMMARY OF THE INVENTION

It is an object of the present invention to provide, in processing an image including a signal component and a background component in a luminescent intensity reading apparatus, a procedure including digitizing the image into a brightness distribution, then arbitrarily setting a certain brightness as a boundary value (threshold value), thereby dividing the image into the signal component and the background component, and outputting a statistical analysis value based on the signal component portion. This procedure realizes an optimized process of calculating an optimum boundary value by using a series of images formed from a series of luminescent substance standard solutions with different concentrations to obtain a calibration curve and calculating the concentration of a luminescent substance in an unknown sample using the calibration curve and the boundary value. The above-mentioned procedure and apparatus are applicable to any measurement target.

In order to achieve the above-mentioned object, a first aspect of the present invention provides, in processing an image including a signal component and a background component in a luminescent intensity reading apparatus, a method and apparatus for reading a luminescent intensity including mechanisms of digitizing the image into a two-dimensional (xy-plane) brightness distribution, then arbitrarily setting a certain brightness as boundary value (threshold value), thereby separating the signal component from the background component, and outputting a statistical analysis value for the signal component. A second aspect of the present invention provides a method and apparatus for reading a luminescent intensity including mechanisms of calculating an optimum boundary value by using a series of images formed from a series of luminescent substance standard solutions with different concentrations to obtain a calibration curve by using the above-mentioned procedure and apparatus and calculating the concentration of a luminescent substance in an unknown sample using the calibration curve and the boundary value.

According to the present invention, an image including a signal component and a background component is processed to obtain an optimized calibration curve, whereby the calculation of signal intensity of a luminescent substance in an unknown sample and the quantification of the luminescent substance are made possible.

DESCRIPTION OF THE PREFERRED EMBODIMENTS

Figure 1:
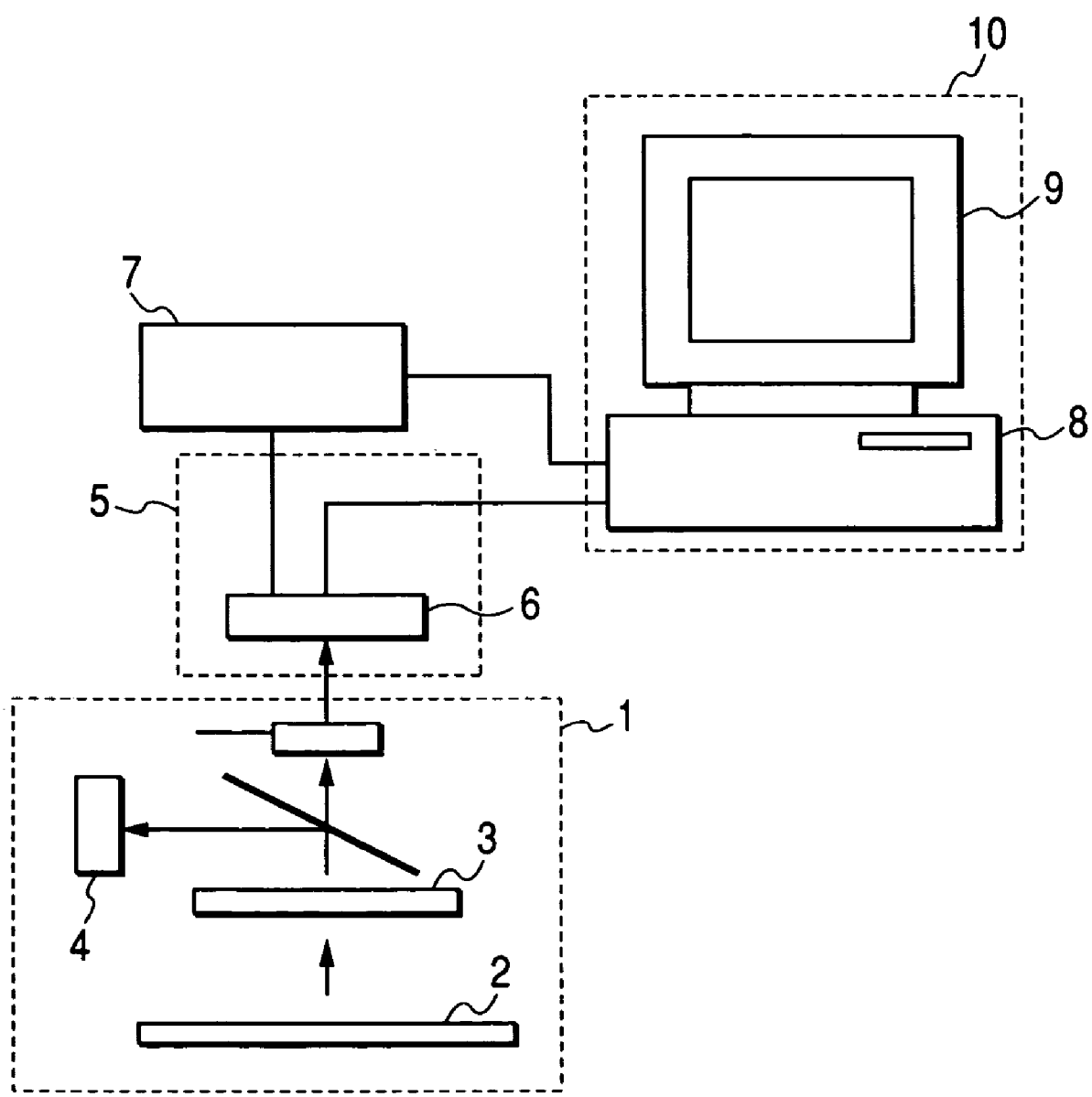
FIG. 1 shows a measurement apparatus according to the present invention.
Figure 2:
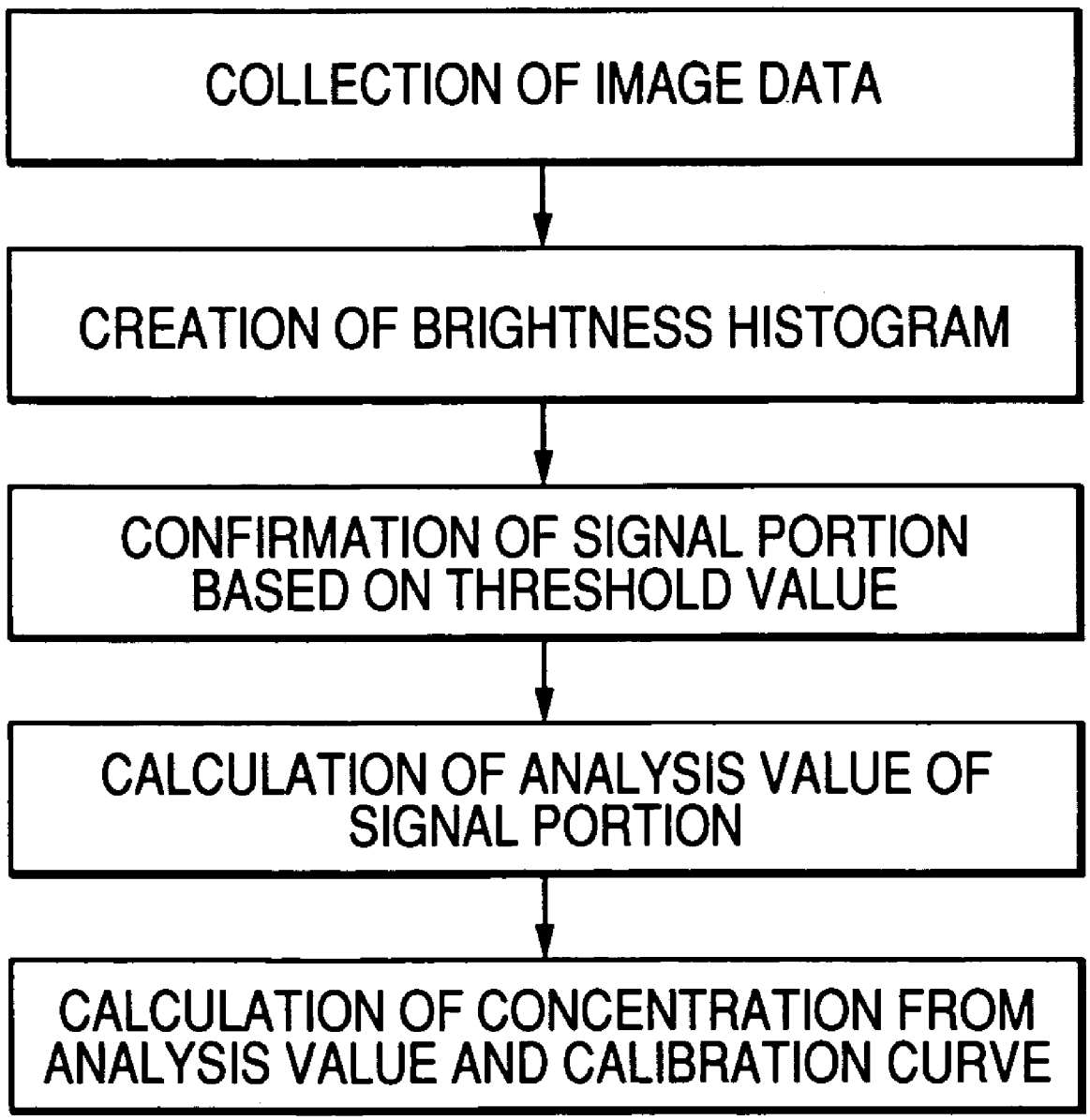
FIG. 2 is an analysis flow chart of an example according to the present invention.
Figure 3:
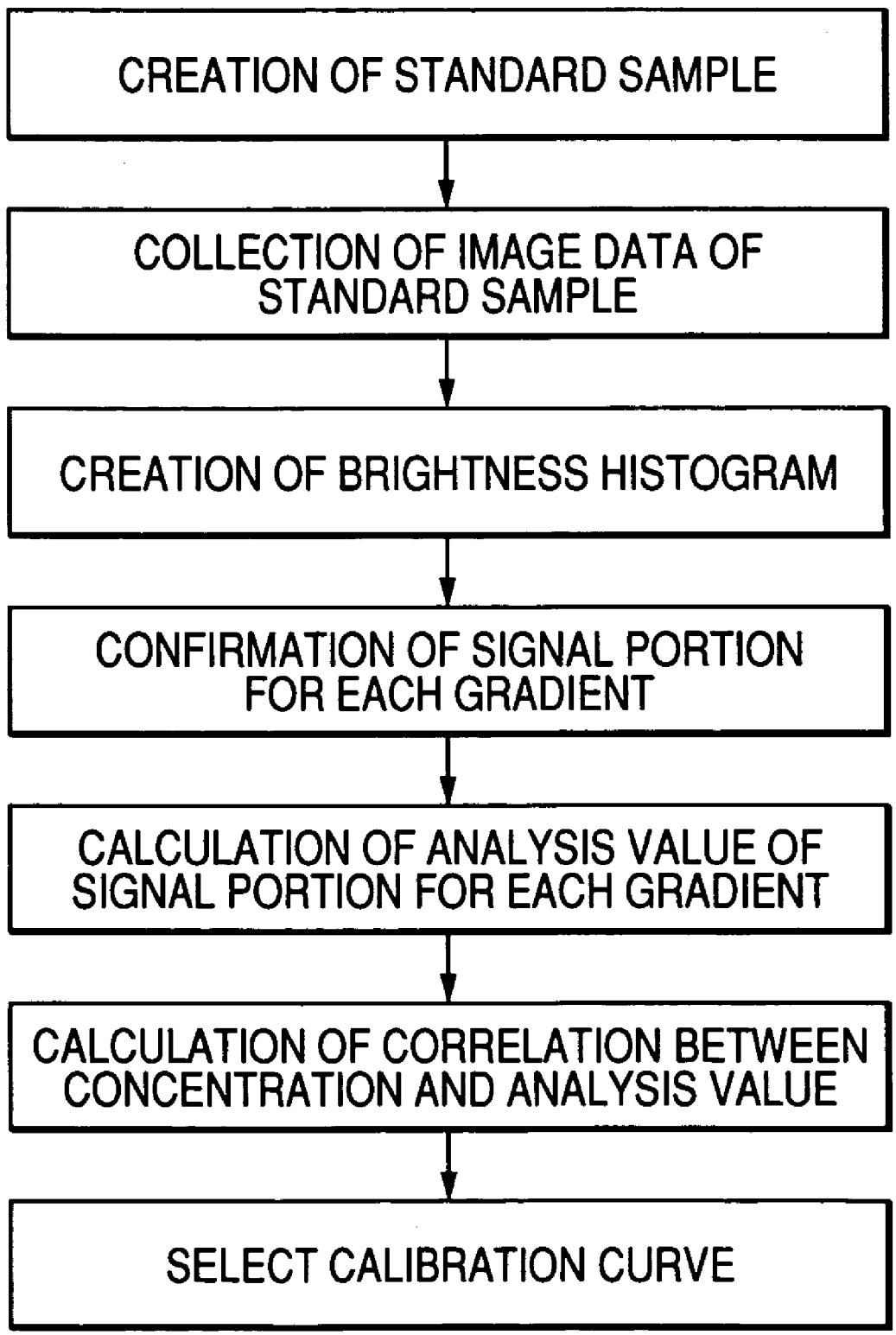
FIG. 3 is a flow chart showing the creation of a calibration curve according to an example of the present invention.

An apparatus for analyzing a luminescent intensity of the present invention can be used for the quantitative analysis of a chemical substance effected by measuring luminescence of the chemical substance. A first embodiment of the present invention is an apparatus for analyzing a luminescent intensity including means for obtaining a measurement image in which a part of a sample having a plurality of luminescent portions and non-luminescent portions in a mixed form is excised, brightness recording means for recording a brightness corresponding to a two-dimensional position of the measurement image, digitization means for digitizing the brightness stored in the brightness recording means in n gradient levels, a first storing means for storing the digitized brightness in a storage device together with information of the two-dimensional position, a first computing means for reading brightness information stored in the storage device to create a brightness histogram, a second computing means for dividing the brightness histogram into luminescent portions from non-luminescent portions based on a threshold gradient value (Grth) stored in a second storing means and computing an analysis value from the luminescent portions, and a third computing means for computing a concentration from a calibration curve stored in a third storing means and the analysis value. The threshold gradient value (Grth) stored in the second storing means is obtained by dividing each brightness histogram created with respect to known concentrations of at least three samples for the calibration curve into luminescent portions and non-luminescent portions by using all the n gradient levels ($Gr_n=1, _n$) as tentative threshold gradient value, computing an analysis value for each gradient level with the second computing means, computing a correlation coefficient between the analysis values and the known concentrations for each of the n gradient levels ($Gr_n=1, _n$) with a fourth computing means, and selecting a gradient level giving a correlation coefficient closest to 1 among the correlation coefficients computed with the fourth computing means. It is preferable that the relationship between the analysis values and the known concentration obtained using the threshold gradient value (Grth) is represented by a calibration curve. As the analysis value, an integral value, a total value, or the like of the luminescent portions can be used.

The means for obtaining a measurement image in which a part of a sample having a plurality of luminescent portions and non-luminescent portions in a mixed form is preferably a microscope, and a confocal microscope is more preferable. Furthermore, the luminescence from a plurality of luminescent portions may be fluorescence, phosphorescence, chemical luminescence, or biological luminescence, and the sample may be a chemical substance containing a luminescent substance carried on a substrate. The substrate may have a plate shape or a three-dimensional solid shape. The three-dimensional solid shape is preferably a through-hole formed in a substrate.

Furthermore, the present invention provides a luminescent intensity analysis method including the steps of: excising a part of a sample having a plurality of luminescent portions and non-luminescent portions in a mixed form to obtain a measurement image; recording a brightness corresponding to a two-dimensional position of the measurement image; digitizing the recorded brightness; storing the digitized brightness in a storage device together with information of the two-dimensional position; reading brightness information stored in the storage device; processing the brightness information into a brightness histogram; dividing the brightness histogram into luminescent portions and non-luminescent portions based on a previously determined threshold gradient value (Grth); obtaining an analysis value from the luminescent portions; and obtaining a concentration from a previously obtained calibration curve and the analysis value. The calibration curve and the threshold gradient value (Grth) can be obtained by dividing each brightness histogram for known concentrations of at least three samples into luminescent portions and non-luminescent portions by using all the n gradient levels ($Gr_n=1, _n$), obtaining an analysis value from the luminescent portions for each gradient level, obtaining a correlation coefficient between the analysis values and the known concentrations for each gradient level, storing a gradient level giving a highest correlation coefficient, and creating the calibration curve representing the relation between the analysis values and the concentrations based on the gradient level giving a highest correlation. The step of obtaining an analysis value is preferably the step of obtaining an integral value, a total value, or the like of the luminescent portions.

The first embodiment of the present invention will be described in more detail. The apparatus for analyzing a luminescent intensity according to this embodiment will excise a part of a chemical substance to be measured with an optical procedure, then accumulate electric charge in a light-receiving device, and measure the intensity (brightness) of received light based on the amount of electric charge. As the light-receiving device, a charge-coupled device (hereinafter, which may be abbreviated as "CCD"), a C-MOS sensor, or a light-receiving diode is generally used. The CCD and the C-MOS sensor are suitable for measuring luminescence from a sample in a plane shape, since light-receiving portions are formed in a matrix shape as pixels in the device.

The amount of electric charge accumulated in the pixels of the light-receiving device can be converted to a digital value by an analog-digital converter (hereinafter, abbreviated as "ADC" or "AD converter"). In the case of using an 8-bit ADC, the charge amount can be digitized into $2^8(256)$ gradient levels. When brightness information accumulated in a CCD or a C-MOS sensor is stored in a storage device, the positional information of a pixel and the brightness information can be simultaneously stored easily.

Figure 7A:
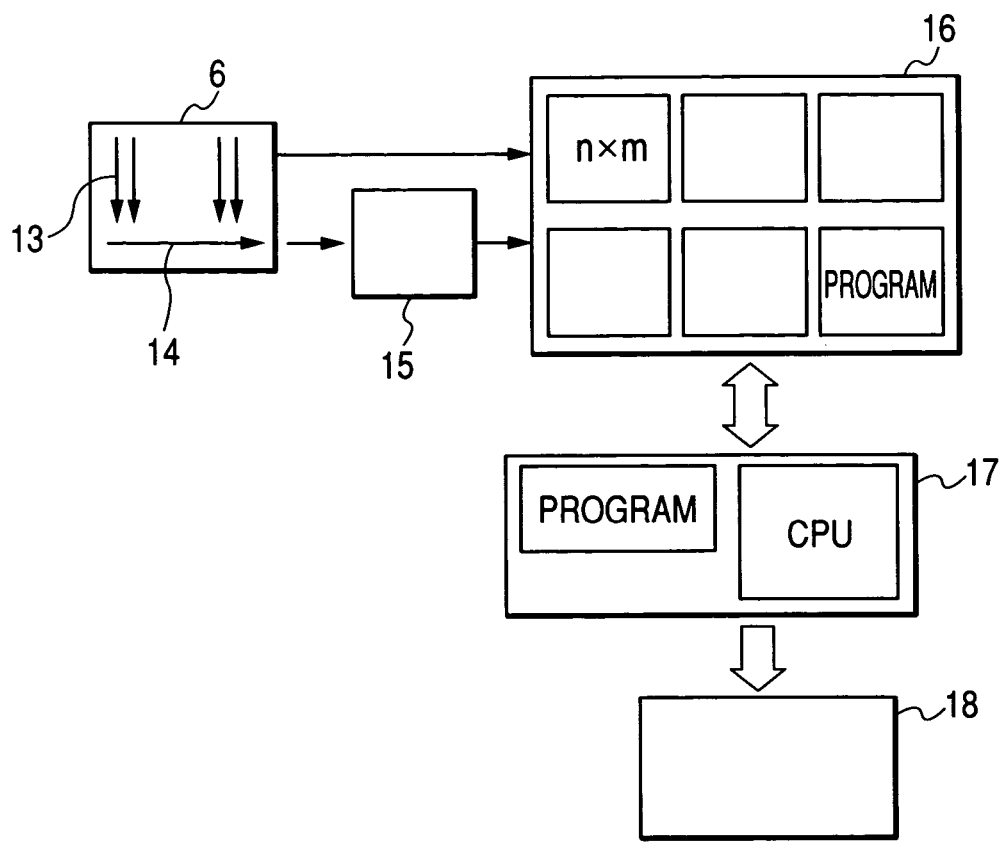
FIGS. 7A and 7B are detailed schematic diagrams of a measurement apparatus according to the present invention.
Figure 7B:
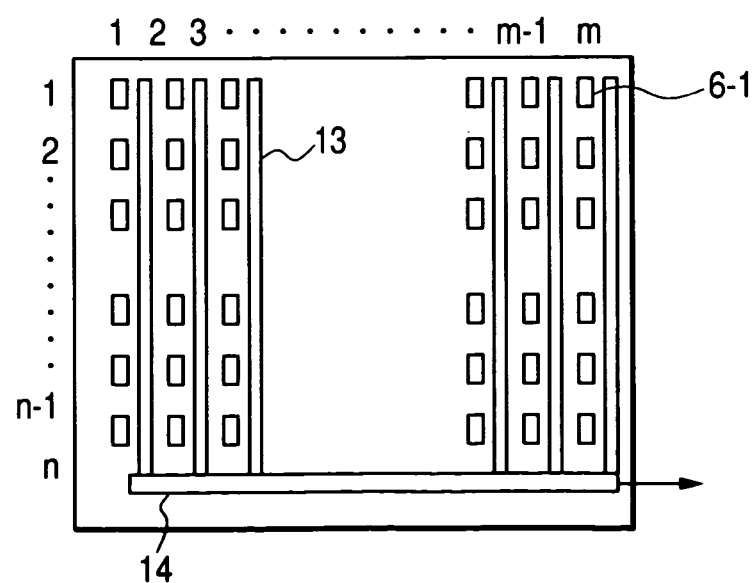

For example, in the case of a CCD composed of n×m pixels, as shown in FIG. 7B, electric charge accumulated in each pixel 6-1 within a given period of time is once transferred to a corresponding vertical shift register 13, and then, transferred downward one after another and finally to a horizontal shift register. Thus, the charge transferred to the horizontal shift register is transferred successively to the outside of the device in the order of m, m−1, m−2, . . . 3, 2, and 1 columns. The transfer in the vertical shift register and the transfer in the horizontal shift register are performed by use of a clock signal supplied to the CCD. When transferred to the outside of the CCD, the charge is once converted to a voltage. The ADC has a function of converting a voltage in an analog value to a digital value. Information transferred to the outside from the CCD is transferred in a determined order from the position of the pixel of the CCD. Therefore, if the same storage area as that of the CCD is previously provided in the storage device 16, synchronizing the transfer of the information with the transfer signal of the vertical and horizontal shift registers of the CCD enables the information to be stored in the same way as in the method of storing image data with a digital camera.

Brightness information is computed, and a brightness histogram is created. A threshold gradient value for separating luminescent portions from non-luminescent portions of the brightness histogram thus created is determined in the procedure described later.

The luminescent portions are separated from the brightness histogram based on a threshold gradient value, and the luminescent portions are analyzed to obtain an analysis value. The concentration of a sample whose concentration is unknown can be determined from the obtained analysis value and a previously created calibration curve.

Samples with plural known concentrations of a luminescent substance to be quantified are prepared. At this time, it is preferable that samples with at least three concentrations are prepared.

Image data is collected for each of the prepared samples of a plurality of concentrations to create a brightness histogram. Then, an analysis value (integral value, total value, etc.) of the luminescent portions is obtained from the brightness histogram, which is performed by using all the gradient levels as tentative threshold gradient value for separating luminescent portions from non-luminescent portions. In the case of using an 8-bit ADC, which has 256 gradient levels, 256 analysis values are obtained for a sample of each concentration. Next, the correlation coefficient between the concentration and the analysis value for each gradient level is obtained. If the luminescent portions can be separated from the non-luminescent portions exactly, the correlation between the analysis value showing the luminescent intensity and the concentration is high. Therefore, a gradient level giving a highest correlation (correlation coefficient is close to 1) becomes a threshold gradient value for separating the luminescent portions from the non-luminescent portions. A calibration curve showing the correlation between the concentration and the analysis value also is obtained simultaneously. The concentration of a sample whose concentration is unknown can be obtained using the calibration curve and the threshold gradient value thus obtained.

The chemical substance quantification using the luminescent intensity analysis method of the present invention is obtained by processing a luminescent brightness distribution image of a chemical substance captured by a CCD camera 5 or the like connected to a microscope 1 as shown in FIG. 1. A luminescent intensity analysis apparatus in FIG. 1 is composed of the microscope 1, the CCD camera 5 receiving image information from the microscope 1, a CCD controller 7 for controlling a CCD 6 constituting the CCD camera 5, and an image processing computer 10. The image processing computer 10 is composed of a computing apparatus 8 for computing image information from the CCD 6 and sending a signal controlling the CCD to the CCD controller 7, and an image display apparatus 9 for displaying an image based on the computed image information. The microscope 1 is composed of a sample 2, an objective lens 3 for receiving luminescence from the sample, a half mirror for separating light condensed by the objective lens 3 into light for visual confirmation and light for a CCD camera (when it is not necessary to simultaneously perform the visual confirmation and the observation with a CCD camera, any ordinary reflective mirror may be used instead of the half mirror), and an eyepiece 4 for receiving light separated by the half mirror.

In this embodiment, since the CCD camera is used, a CCD is used as a light-receiving element. However, C-MOS sensors or light-receiving diodes arranged in a matrix may be used in place of the CCD. At present, a cooling CCD is used frequently for luminescent intensity analysis due to the highest sensitivity.

In a luminescent brightness distribution image, fluorescence, phosphorescence, chemical luminescence, or biological luminescence can be used. Furthermore, luminescence from a chemical substance (e.g., a polymer, nucleic acid, protein, etc.) labeled with a luminescent substance, other than luminescence directly from a chemical substance, also can be used. Consequently, the analysis using a luminescent brightness distribution image of the present invention can be used for detecting a reaction in physical adsorption, chemical reaction, antigen-antibody reaction, hybridization reaction of nucleic acid, etc. in addition to the luminescence of a luminescent substance.

Since a luminescent image of fluorescence or the like is processed, a confocal fluorescent microscope is preferably used as the microscope 1. Owning to the use of the confocal optical system, fluorescence other than that on a focal plane can be made invisible, and a particular plane of a thick sample can be focused. Furthermore, since the CCD camera 5 is directed to detect faint light, it is preferable to use a cooling CCD camera adapted for cooling the CCD 6.

Figure 4:
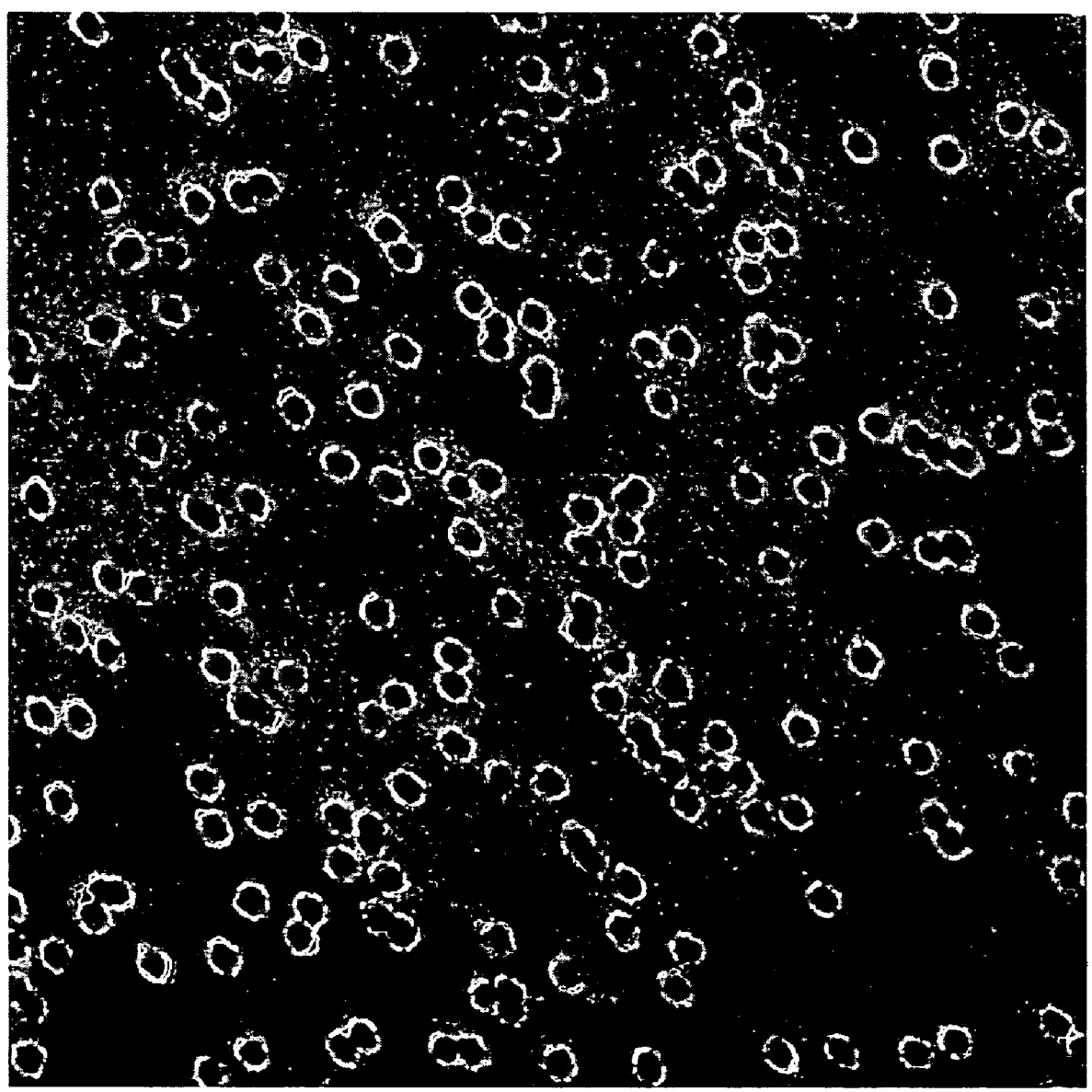
FIG. 4 shows a fluorescent image according to an example of the present invention.

FIG. 4 shows a luminescent brightness distribution image obtained by the luminescent intensity analysis apparatus shown in FIG. 1.

Next, the luminescent brightness analysis method using the luminescent brightness distribution image in FIG. 4 will be described in detail with reference to the drawings.

(1) Collection of Image Data

Image information collected from a sample is based on data on the amount of charge accumulated in pixels of a CCD. The accumulation time can be changed by the CCD controller based on the intensity of luminescence to be collected. The accumulation time with respect to the pixels of the CCD is set in accordance with a concentration range of a sample to be measured. The amount of charge accumulated in the pixels of the CCD is sent to the computing apparatus together with positional information corresponding to a column/row of the CCD, and stored in a storage area of the computing apparatus.

(2) Creation of Brightness Histogram

Figure 5A:
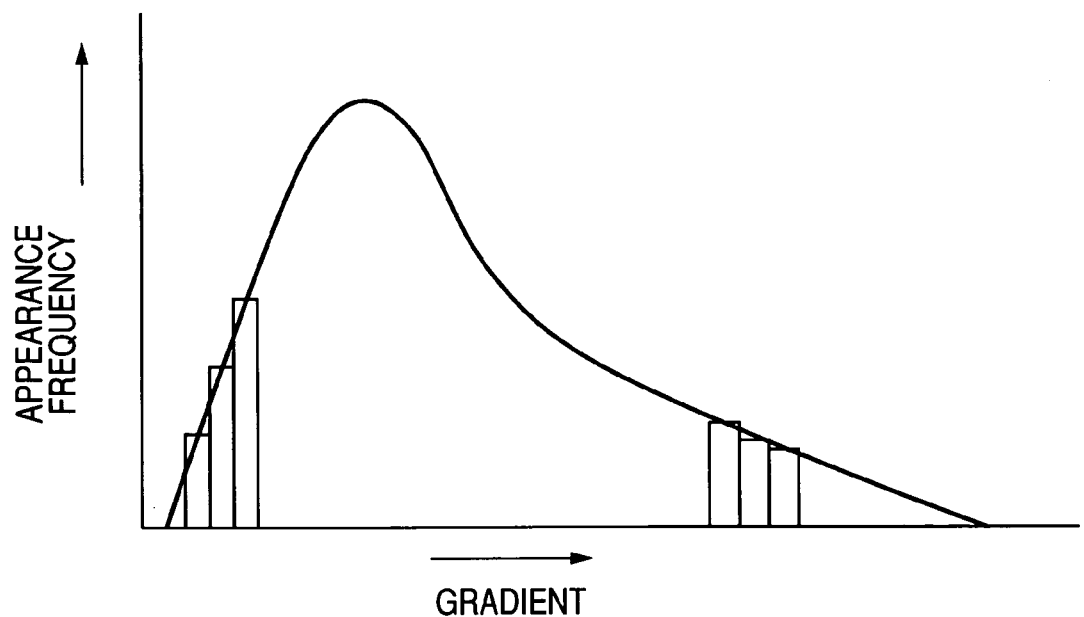
FIGS. 5A and 5B respectively show a brightness histogram according to an example of the present invention.

A brightness histogram based on the charge amount of each pixel using a pixel of the CCD as a unit is created from the collected image data, as shown in FIG. 5A. The brightness is obtained by converting the charge accumulated in the pixels of the CCD to a digital form by an analog/digital converter (hereinafter, abbreviated as ADC), and can be classified into brightness of 256 gradient levels at most in the case of using an 8-bit ADC. A brightness histogram may be created using a plurality of pixels (e.g., 4 pixels (2×2)) as one unit.

In the case of creating a brightness histogram using a plurality of pixels as one unit, the analysis value (integral value, total value, etc.) of the charge amount of a plurality of pixels can be used.

(3) Confirmation of Signal Portion Based on Threshold Value

A signal and a background are divided using a threshold value, which is determined when a calibration curve described later is created, whereby a signal portion is confirmed.

(4) Calculation of Analysis Value of Signal Portion

An analysis value (integral value, total value, etc.) is obtained from the signal portion.

(5) Calculation of Concentration from Analysis Value and Calibration Curve

The concentration of a sample is obtained from a calibration curve and the obtained analysis value of the signal portion.

Needless to say, the analysis value at this time is obtained by the same procedure as that of the analysis value used for creating a calibration curve.

(6) Creation of a Calibration Curve 6-1 Creation of a Standard Sample

A series of concentrations of luminescent substance standard solutions to be quantified are prepared, and a sample with each concentration is produced.

6-2 Collection of Image Data of Standard Sample

Image data of a sample with each concentration is collected by a CCD camera.

6-3 Creation of Brightness Histogram

A brightness histogram of each collected standard sample is created.

6-4 Confirmation of a Signal Portion for Each Gradient

A signal and a background are divided using all the gradient levels as a threshold value, thereby confirming a signal portion for each gradient.

6-5 Calculation of Analysis Value of Signal Portion for Each Gradient

An analysis value (integral value, total value, etc.) is obtained from data of the signal portion for each gradient.

6-6 Calculation of Correlation Between Concentration and Analysis Value

Figure 6:
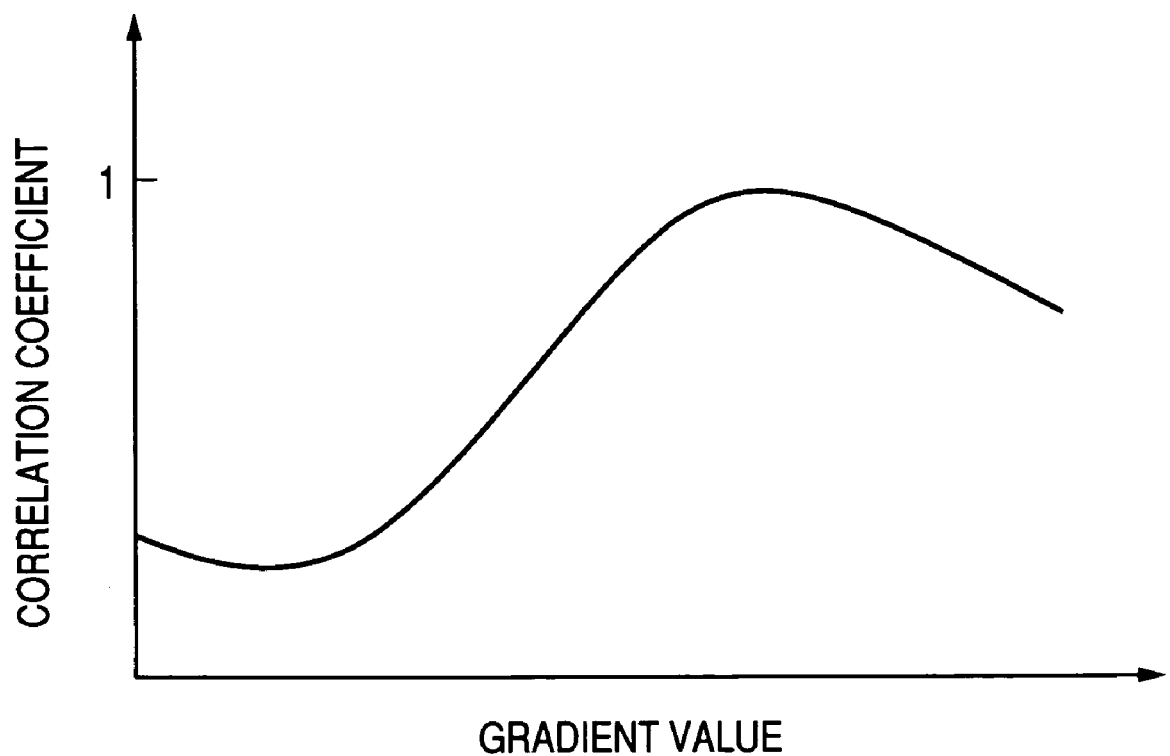
FIG. 6 is a graph showing the relation between a correlation coefficient and a gradient value adopted as boundary value for creating a calibration curve according to an example of the present invention.

The obtained analysis value of each gradient is compared with the concentration of a sample to check the correlation of a calibration curve, and the correlation coefficient between the gradient used as a threshold value and the concentration of a sample is obtained (see FIG. 6). The gradient with the highest correlation with the concentration is set to be a threshold value.

At this time, an analysis method and a gradient to be a threshold value with the highest correlation can also be obtained by variously changing a method of obtaining an analysis value.

6-7 Selection of a Calibration Curve

A calibration curve is selected from the analysis value with the highest correlation with the concentration.

The configuration and operation of the luminescent intensity analysis apparatus of this example will be described in more detail with reference to FIGS. 7A and 7B.

The luminescence from a sample is incident upon the CCD 6 having n×m pixels. The charge proportional to the intensity of incident light is accumulated in corresponding pixels. The charge accumulated in each pixel is successively transferred from the vertical shift register 13 to the horizontal shift register 14. The charge transferred to the horizontal shift register 14 is transferred from the CCD 6 to the AD converter 15 by the horizontal shift register 14. The charge transferred to the AD converter 15 is converted from an analog value to a digital value by the AD converter 15. In the case of using an 8-bit AD converter, the transferred charge is converted to a 256-gradient digital value. The brightness data of the pixels converted to a digital value is stored in the storage device 16 together with positional information.

As the storage device 16, a storage device such as a dynamic memory (hereinafter, abbreviated as DRAM) or a hard disk device (hereinafter, abbreviated as HDD) can be used. Owning to a large amount of data, an HDD is preferable. The above description has been made assuming that the entire sample can be measured at a time. In the case of measuring a sample by dividing it into N×M sections, the above procedure only needs to be performed N×M times. Therefore, the following description will be made assuming the case where the entire sample can be measured at a time.

Regarding the n×m brightness data stored in the storage device 16, the distribution of data in each gradient is computed by the computing apparatus 17. The procedure (program) of the computation is also stored in the storage device 16, and transferred to the storing region of the computing apparatus 17. The computing apparatus 17 computes the distribution of gradients of brightness data in accordance with the procedure of the program. The computed distribution of gradients can be displayed in the display apparatus 18. FIG. 5A shows the computed distribution of gradients (brightness histogram).

Figure 5B:
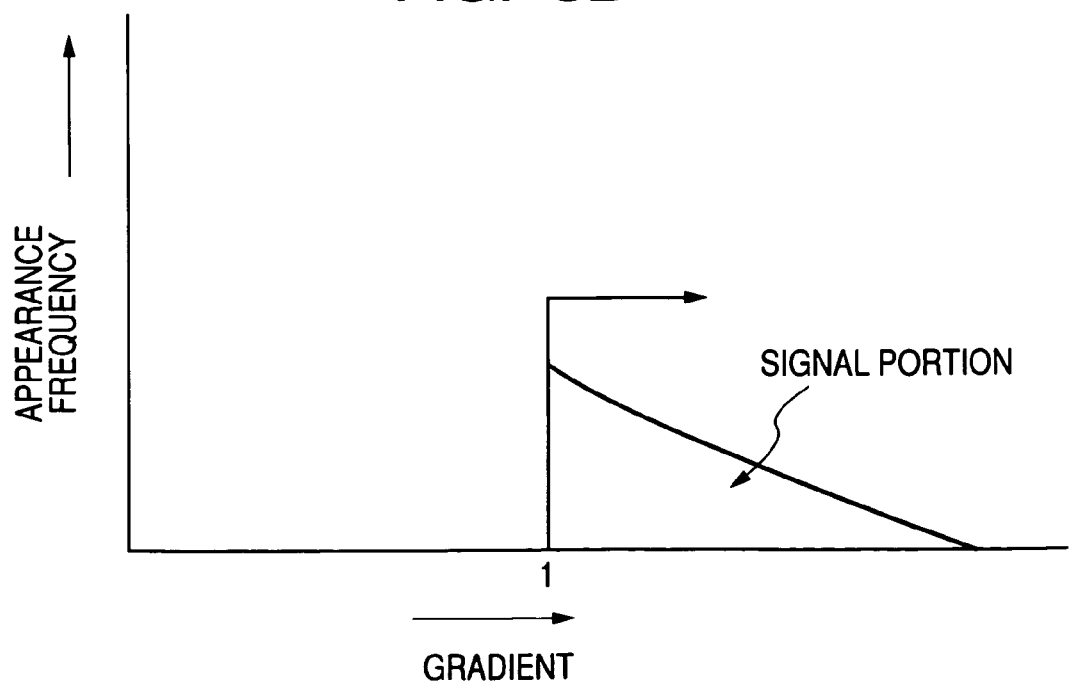

In the case where 1-gradient is a threshold value in FIG. 5A, 1-gradient or more becomes a signal portion. In this case, a region shown in FIG. 5B becomes a signal portion, and the value obtained by integrating the signal portion is set to be an analysis value. The analysis value is not limited to an integral value, and a total value, an average value, etc. can be used.

In the case of obtaining a calibration curve, an analysis value is obtained with respect to every gradient value of 0 to 255 gradient levels to be a threshold value for each brightness data of a standard sample with each concentration, and the concentration, the gradient value to be a threshold value, and the analysis value are stored in the storage device 16. Thereafter, the correlation coefficient between the analysis value and the concentration of a sample with each concentration in the case where the gradient value to be a threshold value is the same. Regarding the correlation coefficient of each gradient value, the results as shown in FIG. 6 are obtained. The gradient value with the correlation coefficient closest to 1 is set to be a threshold value. The relationship among the gradient value to be a threshold value, the concentration, and the analysis value are stored in the storage device 16. The relationship between the concentration and the analysis value can be stored, for example, under the condition that the calibration curve is y=f(x), where y is a concentration, and x is an analysis value.

In the case of obtaining the concentration of a sample whose concentration is unknown, a brightness histogram is obtained in a similar procedure, and the analysis value from the signal portion is applied to the calibration curve, whereby the concentration can be calculated from the gradient value to be a threshold value.

Hereinafter, the present invention will be described further specifically by way of examples with reference to the drawings. The present invention is not limited to the following examples.

FIRST EXAMPLE

In this example, a confocal fluorescent microscope was used as a microscope. Furthermore, a porous membrane filter (e.g., Nuclepore Membrane, produced by Whatman) made of polycarbonate was used as a substrate for fixing a luminescent substance. As a luminescent substance, a rhodamine solution was allowed to pass through the filter mounted on a filter holder (e.g., KS-13, produced by Toyo Filter Paper Corporation). Rhodamine was physically adsorbed to the surface of the polycarbonate filter. The polycarbonate filter had a thickness of about 15 um, and rhodamine was adsorbed in a film three-dimensionally. When observed with a confocal microscope, a fluorescent image can be obtained for a sliced layer of the polycarbonate filter.

First, a calibration curve was created. A concentration sequence of rhodamine was prepared using a membrane filter with a pore diameter of 0.8 um and a thickness of 10 um, and was allowed to pass through separate polycarbonate filters. Each polycarbonate filter may be washed to remove an excess rhodamine solution. The filters with rhodamine adsorbed thereto were successively measured for a fluorescent image shown in FIG. 4 with a confocal microscope. The obtained images were converted to a histogram of brightness of about 256 gradient levels as shown in FIG. 5A. In order to obtain a gradient to be a threshold value, each image was divided into a signal component and a background component using every gradient as a boundary value to calculate an integral value of brightness. The correlation coefficient between the concentration of each sample and the integral value was calculated for each gradient, whereby a gradient to be an optimum threshold was obtained from each gradient and its correlation coefficient (see FIG. 6). In this example, the correlation with the concentration when a 222-gradient was used as a threshold value was highest. A calibration curve was created based on a gradient to be a threshold value. In this example, the calibration curve was obtained as a linear function, and used as a relation formula between the analysis value and the concentration.

Rhodamine whose concentration was unknown was quantified using the calibration curve.

The above description is directed to the case of a substrate having a three-dimensional solid configuration such as a polycarbonate membrane, and the case of using image data at the same measurement depth.

Also considering the measurement thickness, in the case of a membrane filter with a thickness of 10 um of this example, by summing image data of a brightness distribution obtained at three portions, that is, the upper surface, bottom surface, and intermediate portion of the membrane filter, for each position corresponding to a pixel of a CCD, measurement precision can be enhanced regarding the collection of a sample images with each concentration. Furthermore, by obtaining an analysis value and analyzing a correlation with respect to each image measured in the thickness direction, a more optimum position in the thickness direction, and the measurement thickness and threshold value to be measured are obtained, and measurement precision can be enhanced.

SECOND EXAMPLE

In the case where a substrate for measurement has a reactive group, a substance to be quantified is covalently bonded, whereby measurement can be performed. In the case of using a membrane the surface of which is modified with a reactive group (e.g., Immunodyne ABC membrane, produced by Nihon Pall Ltd.), the reactive group on the surface of the membrane reacts with an amino group of a protein to form a covalent bond. Fluorescein-4-isothiocyanate (FITC) labeled antibody is dropped as a substance to be quantified to the membrane. A concentration sequence is prepared, and allowed to react for a predetermined period of time. Thereafter, the concentration sequence is washed with a blocking reagent (e.g., bovine serum albumin, casein, etc.), and used for measurement. The membrane is not transparent to light, so that fluorescence from the surface of the membrane is measured.

In the same way as in the image processing in Example 1, a brightness histogram is created, and an optimum gradient value to be threshold value is obtained based on a correlation coefficient. Next, a calibration curve is created based on the gradient value obtained as a threshold value, and bound protein whose concentration is unknown is quantified using the calibration curve.

Furthermore, using a non-labeled antibody for a specific antigen in place of above FITC labeled antibody, the membrane is processed successively by immobilization by the covalent bond of the non-labeled antibody, washing with a blocking reagent, and incubating with an antigen and an FITC labeled antibody, whereby sandwich immunoassay is performed, which can be used for quantification of an antigen.

This application claims priority from Japanese Patent Application No. 2004-104943 filed on Mar. 31, 2004, which is hereby incorporated by reference herein.

What is claimed is:

1. A luminescent intensity analysis apparatus, comprising:
   means for obtaining a measurement image in which a part of a sample having a plurality of luminescent portions and non-luminescent portions in a mixed form is excised;
   brightness recording means for recording a brightness corresponding to a two-dimensional position of the measurement image;
   digitization means for digitizing the brightness stored in the brightness recording means in n gradient levels;
   a first storing means for storing the digitized brightness in a storage device together with information of the two-dimensional position;
   a first computing means for reading brightness information stored in the storage device and creating a brightness histogram;
   a second computing means for dividing the brightness histogram into luminescent portions and non-luminescent portions based on a threshold gradient value (Grth) stored in a second storing means and computing an analysis value from the luminescent portions; and
   a third computing means for computing a concentration from a calibration curve stored in a third storing means and the analysis value,
   wherein said threshold gradient value (Grth) is a gradient level giving a correlation coefficient closest to 1 among correlation coefficients computed for each of the n gradient levels ($Gr_{n=1, n}$) by the third computing means, each of the correlation coefficients representing a relation between analysis values and known concentrations, each of the analysis values being computed by the second computing means for a brightness histogram created with respect to the corresponding known concentration of at least three samples prepared for obtaining a calibration curve, and
   wherein the calibration curve between analysis values and known concentrations based on the threshold gradient value (Grth) is stored in the third storing means.

2. A luminescent intensity analysis apparatus according to claim 1, wherein the analysis value is an integral value or a total value for the plurality of luminescent portions.

3. A luminescent intensity analysis apparatus according to claim 1, wherein the means for obtaining a measurement image in which a part of a sample having a plurality of luminescent portions and non-luminescent portions in a mixed form is excised is a microscope.

4. A luminescent intensity analysis apparatus according to claim 3, wherein the microscope is a confocal microscope.

5. A luminescent intensity analysis apparatus according to claim 1, wherein luminescence from the plurality of luminescent portions is selected from the group consisting of fluorescence, phosphorescence, chemical luminescence, and biological luminescence.

6. A luminescent intensity analysis apparatus according to claim 1, wherein the sample is a compound containing a luminescent substance carried on a substrate.

7. A luminescent intensity analysis method, comprising the steps of:
   excising a part of a sample having a plurality of luminescent portions and non-luminescent portions in a mixed form to obtain a measurement image;
   recording a brightness corresponding to a two-dimensional position of the measurement image;
   digitizing the recorded brightness;
   storing the digitized brightness in a storage device together with information of the two-dimensional position;
   reading brightness information stored in the storage device;
   processing the brightness information into a brightness histogram;

dividing the brightness histogram into luminescent portions and non-luminescent portions based on a previously determined threshold gradient value (Grth);

obtaining an analysis value from the luminescent portions; and obtaining a concentration from a previously obtained calibration curve and the analysis value, wherein said threshold gradient value (Grth) is a gradient level giving a correlation coefficient closest to 1 among correlation coefficients obtained for each of the n gradient levels ($Gr_{n=1, n}$), each of the correlation coefficients representing a relation between analysis values and known concentrations, each of the analysis values being computed for a brightness histogram created with respect to the corresponding known concentration of at least three samples prepared for obtaining a calibration curve, and wherein the calibration curve represents a relation between analysis values and known concentrations based on the threshold gradient value (Grth).

* * * * *